(12) United States Patent
Broeski

(10) Patent No.: US 6,279,760 B1
(45) Date of Patent: Aug. 28, 2001

(54) RACK FOR SMALL CONTAINERS

(76) Inventor: Thomas Joseph Broeski, Rte. 1, Box 474, Afton, VA (US) 22920

( * ) Notice: Subject to any disclaimer, the term of this patent is extended or adjusted under 35 U.S.C. 154(b) by 0 days.

(21) Appl. No.: 09/324,870

(22) Filed: Jun. 2, 1999

Related U.S. Application Data

(60) Provisional application No. 60/123,593, filed on Mar. 10, 1999.

(51) Int. Cl.[7] ............................ A47G 29/00; A47B 73/00
(52) U.S. Cl. ..................... 211/71.01; 211/74; 206/149; 206/446
(58) Field of Search ............................ 211/71.01, 72–75, 211/85, 85.18, 85.21–85.23, 85.39, 87.01; D7/701, 704; 206/446, 154, 145, 147, 158, 485.1, 148–149; 248/610–612, 102–104, 174, 247–248, 300, 311.2, 312.1; 294/159, 165

(56) References Cited

U.S. PATENT DOCUMENTS

| | | | | |
|---|---|---|---|---|
| D. 110,691 | * | 8/1938 | Dudley | D7/701 |
| D. 146,592 | * | 4/1947 | Blume | D7/701 |
| D. 191,715 | * | 11/1961 | Logowski et al. | D7/701 |
| D. 307,373 | * | 4/1990 | Bearak | 206/149 X |
| D. 331,174 | * | 11/1992 | Polski | D7/701 |
| 570,408 | * | 10/1896 | Jones . | |
| 1,311,966 | * | 8/1919 | Hannon | 248/311.2 |
| 1,396,027 | * | 11/1921 | Day . | |
| 1,634,953 | * | 7/1927 | McCune et al. . | |
| 1,818,059 | * | 8/1931 | Gavlak | 248/312.1 |
| 1,879,751 | * | 9/1932 | Keiser | 248/311.2 |
| 2,307,992 | * | 1/1943 | Calhoun et al. . | |
| 2,650,702 | * | 9/1953 | Shanahan . | |
| 2,722,365 | * | 11/1955 | Phipps | 206/149 |
| 2,860,771 | * | 11/1958 | Spiegel, Jr. et al. . | |
| 3,029,934 | * | 4/1962 | Hennessey . | |
| 3,083,825 | * | 4/1963 | Larsen | 206/149 |
| 3,152,688 | * | 10/1964 | Mahon . | |
| 3,203,580 | * | 8/1965 | Erickson | 294/159 |
| 3,314,590 | * | 4/1967 | Tolaas | 206/149 |
| 3,527,345 | * | 9/1970 | Iorio . | |
| 3,653,580 | * | 4/1972 | Mahon | 206/149 |
| 3,866,818 | * | 2/1975 | Smith | 206/149 |
| 4,095,693 | * | 6/1978 | Killy | 206/148 |
| 4,828,211 | * | 5/1989 | McConnell et al. | 211/75 |
| 4,938,356 | * | 7/1990 | Galiegue et al. | 206/446 |
| 5,322,668 | * | 6/1994 | Tomasso | 206/446 |
| 5,501,499 | * | 3/1996 | Zitka | 294/159 |
| 5,715,953 | * | 2/1998 | Brown | 211/74 |
| 5,855,275 | * | 1/1999 | Hunter et al. | 206/485.1 |
| 6,012,585 | * | 1/2000 | Parker | 211/74 |

* cited by examiner

*Primary Examiner*—Daniel P. Stodola
*Assistant Examiner*—Jennifer E. Novosad
(74) *Attorney, Agent, or Firm*—Sheldon H. Parker

(57) ABSTRACT

A rack to hold pre-designed containers such as jars, cans, powered drink tubs and the like, or custom designed containers that specifically interact with the rack. The rack has one or more pairs of resilient arms extending out from a back panel, at about 90 degrees, to form container holders. Each of the resilient top arms has formed protrusions or indents that interact with opposing protrusions or indents within the container lid. The bottom arm is designed to interact with the shape of the base of the container.

21 Claims, 4 Drawing Sheets

FIG. 5
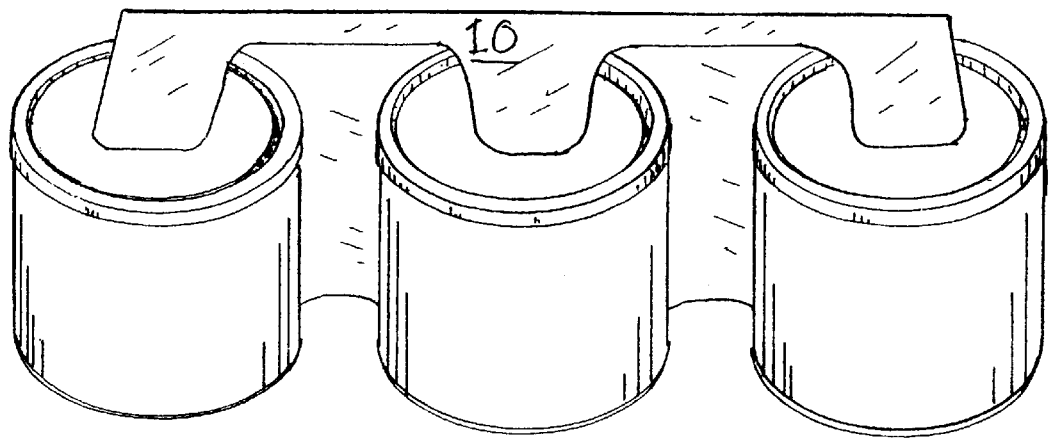
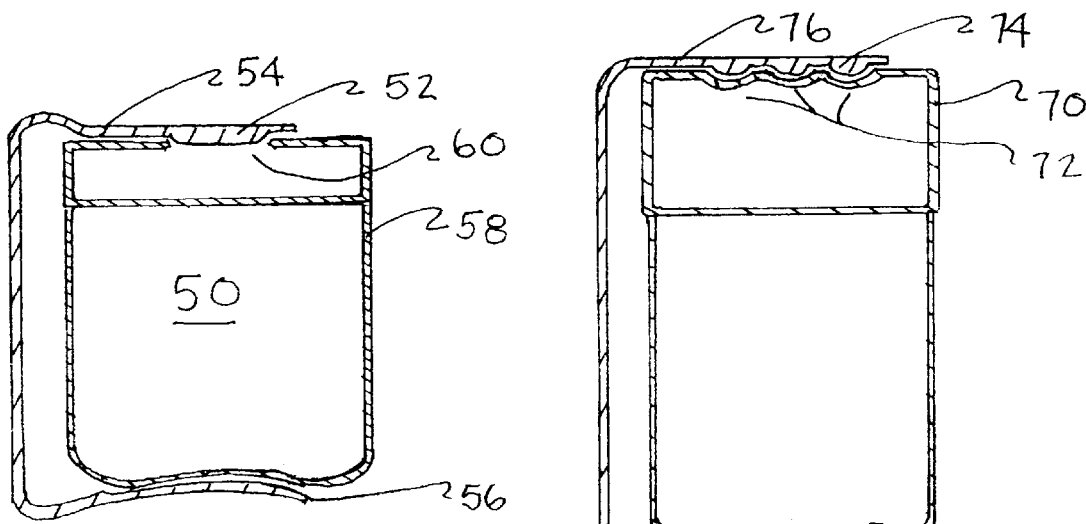
FIG. 6
FIG. 7
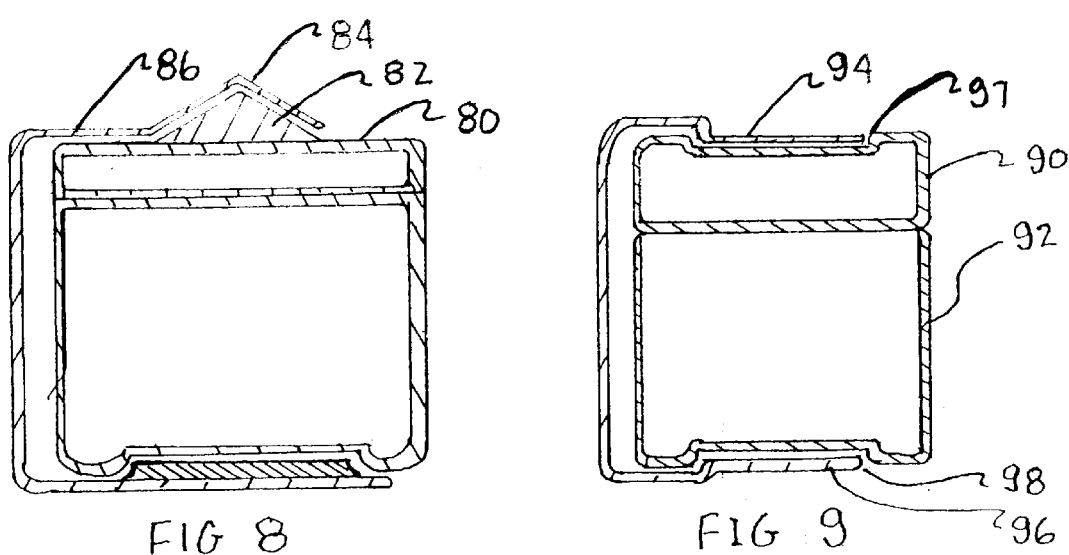
FIG. 8
FIG. 9

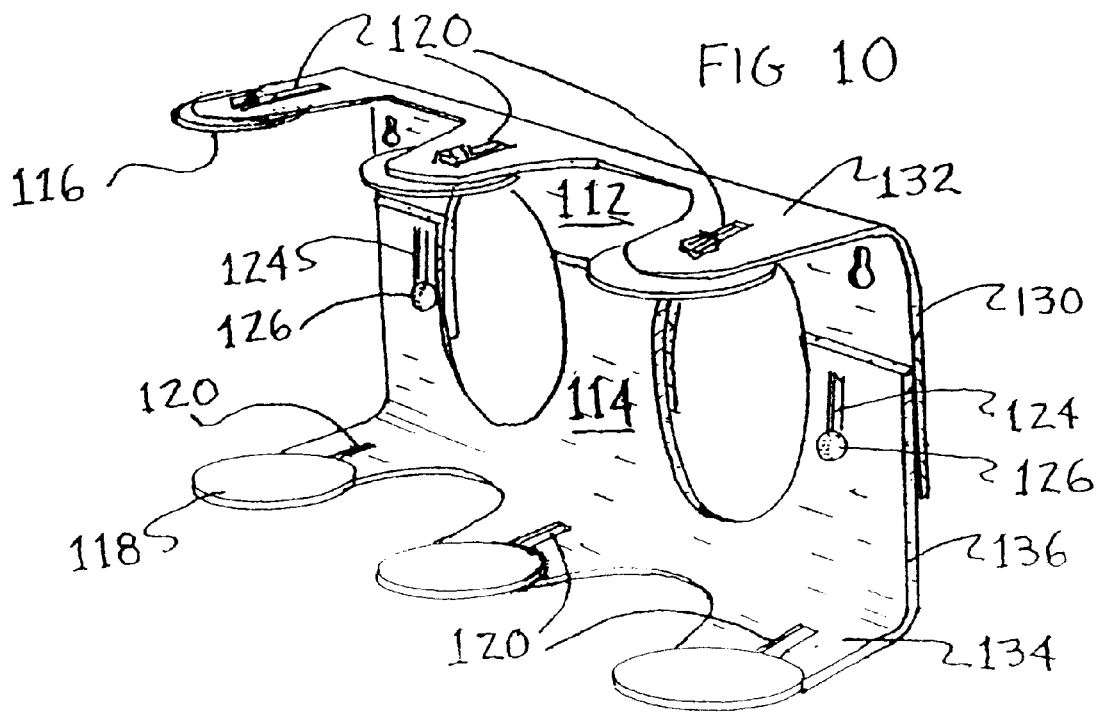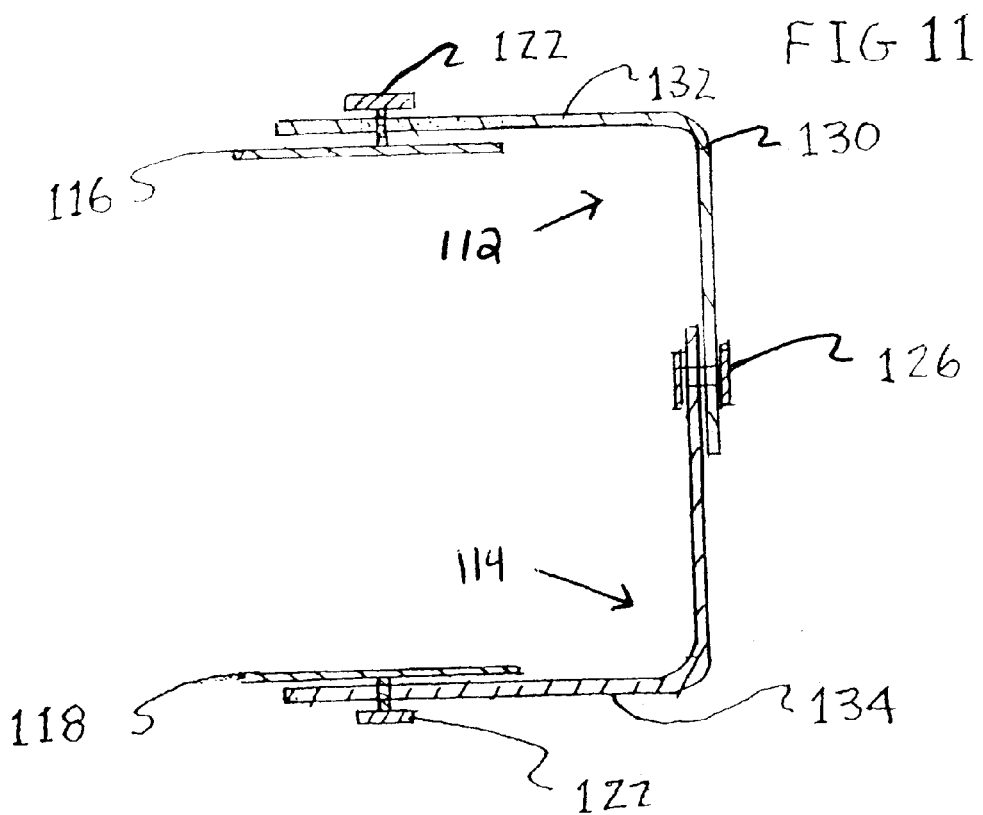

RACK FOR SMALL CONTAINERS

CROSS REFERENCE TO RELATED APPLICATION

This application claims the benefit of priority pursuant to 35 USC §119(e)(1) from the provisional patent application filed pursuant to 35 USC §111(b), Ser. No. 60/123,593, on Mar. 10, 1999.

FIELD OF THE INVENTION

This invention relates to racks for holding small containers. Specifically, the invention relates to a rack designed to mount to a wall or other fixed surface hold containers with various lid and base configurations that interact with the rack.

BRIEF DESCRIPTION OF THE PRIOR ART

Various types of container holders are available, none of which specifically hold the container by means of a top and bottom retainer specifically designed to fit the shape and recesses of either the top and/or bottom of the container.

SUMMARY OF THE INVENTION

In accordance with the present invention, the disclosed container rack is formed or molded in such a way as to receive and maintain a container in its upright position through the use of retaining arms. The arms extend from the back of the unit in a slightly less than 90 degree angle to provide a spring loading effect. The portion of the holding arms that are in contact with the container are molded with bumps, ridges, bars, recesses, or other shapes as fit the design of the container being retained.

In an alternate embodiment the back of the rack can be formed in two pieces with each of the pieces containing slots. These slots enable the distance between the top and bottom arms to be varied. The arms can also contain slots to enable the bottom arm receiving member and the top arm interaction member to be adjustable along the length of the arm to accommodate variable depth containers.

BRIEF DESCRIPTION OF THE DRAWING

The advantages of the instant disclosure will become more apparent when read with the specification and the drawings, wherein:

FIG. 5 is a perspective top view of the rack of FIG. 1 holding the containers;

FIG. 6 is a side view of an alternate embodiment wherein the top arm protrusion serves as a closure lid to the container;

FIG. 7 is a side view of an alternate embodiment wherein the lid has multiple small indents and the top arm has multiple interacting protrusions;

FIG. 8 is a side view of an alternate embodiment wherein the lid is provided with a protrusion and the top arm provided with the receiving recess;

FIG. 9 is a side view of an alternate embodiment wherein the lid has a single indent and the top arm has a single protrusion;

FIG. 10 is a perspective view of an adjustable rack;

FIG. 11 is a side view of the rack of FIG. 10;

DETAILED DESCRIPTION OF THE INVENTION

The present invention provides a method of holding one or more containers in an easily accessible manner. The disclosed design provides the advantage that the containers are easier to grip for removal from, and replacement to, the rack. Further, the pressure required to remove the containers from the disclosed rack is even, since the pressure applied by the rack to maintain the containers in position is evenly distributed. This is unlike racks that grip the containers only at the top or sides, where pressure must be applied toward the clipped area. The even top and bottom pressure exerted by the disclosed rack makes it easier for children and people with arthritis to grip and remove the container. It should be noted that the drawings show the rack in use with three containers, but it should not be construed as a limiting factor, since the rack can be produced as a single or multiple unit.

Figure 1:
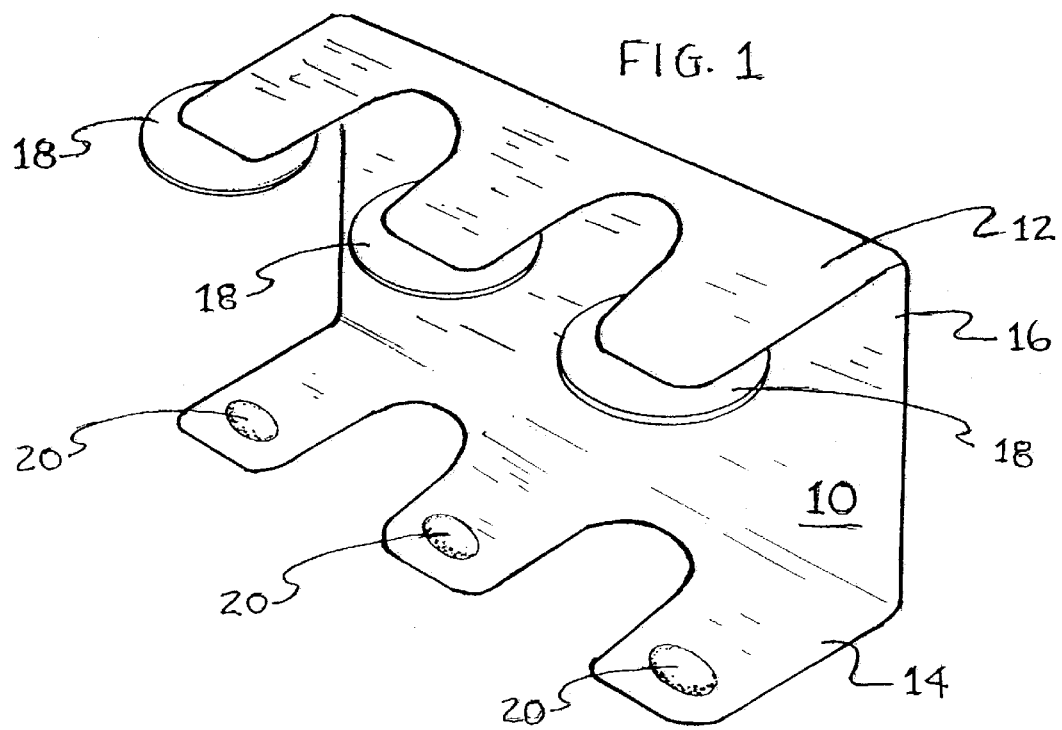
FIG. 1 is a perspective side view of an empty rack constructed in accordance with the present invention.
Figure 2:
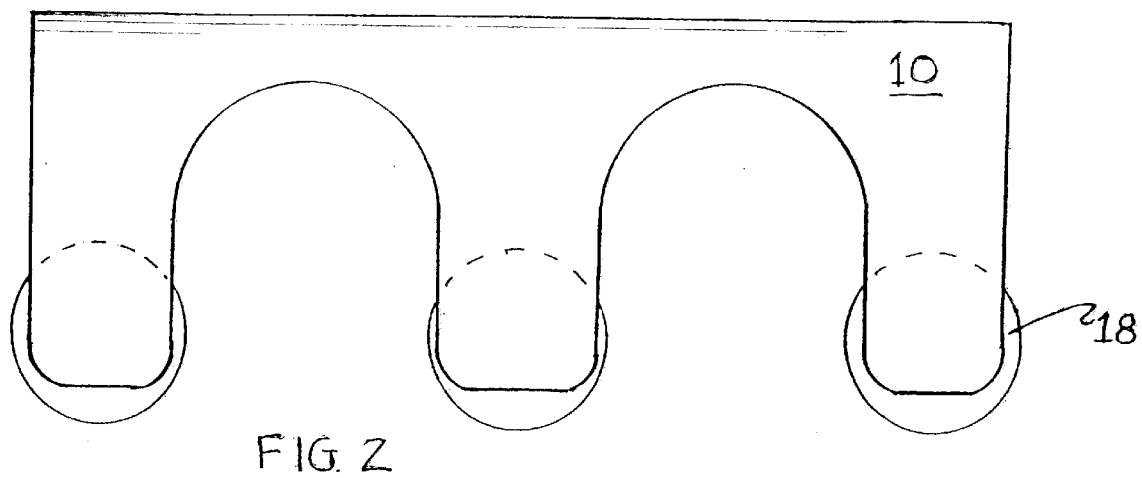
FIG. 2 is a top view of the rack of FIG. 1.
Figure 3:
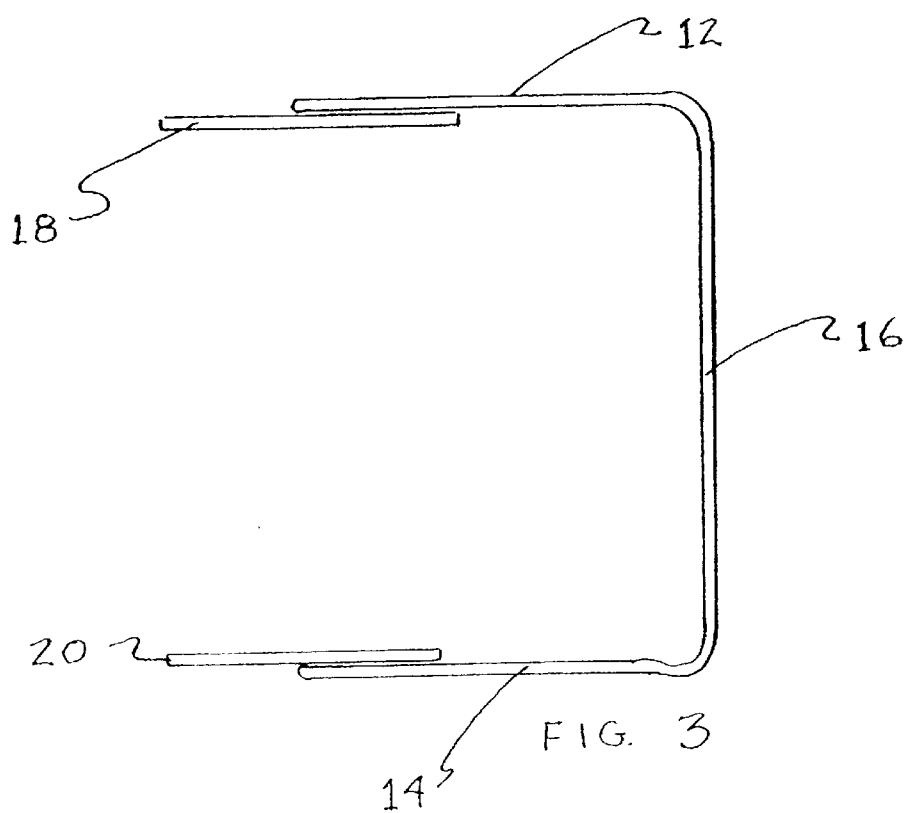
FIG. 3 is a side view of the rack of FIG. 1.
Figure 4:
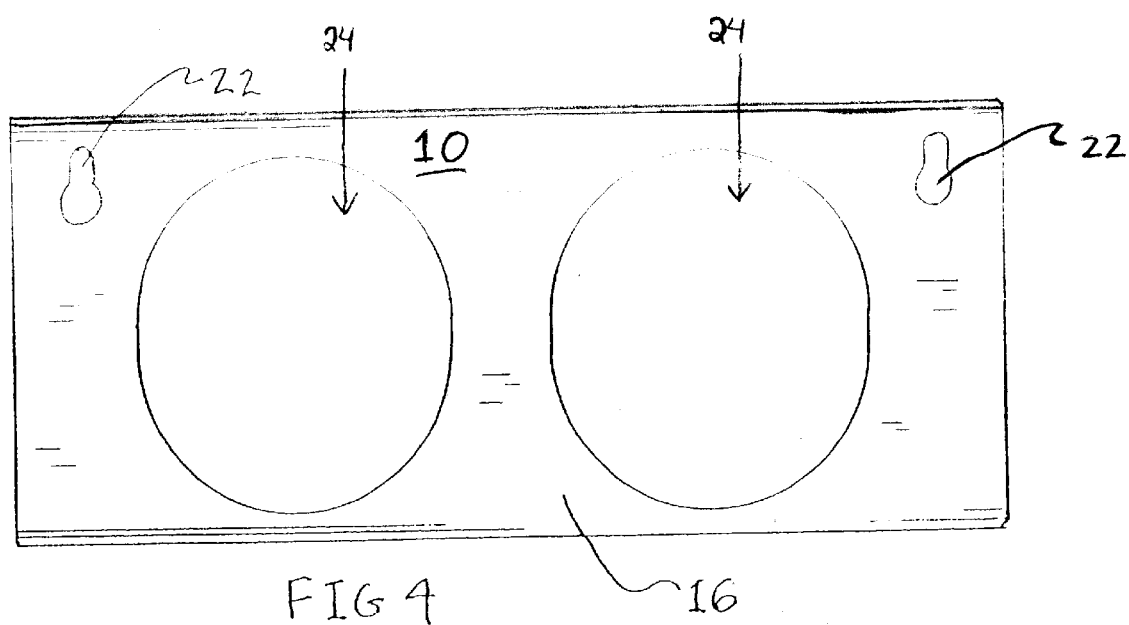
FIG. 4 is rear view of the rack.

The rack 10 in FIG. 1 is made of durable, resilient material having sufficient strength and flexibility to permit containers to be repeatedly inserted and removed without cracking or distorting the arms of the rack 10. The top arms 12 and bottom arms 14 extend from the back 16 at an angle of about in the range of 90 degree, however the exact angles will be dependent upon the containers. The containers are held by the pair of opposing arms 12 and 14, which form a spring. The top and bottom arms 12 and 14 contain locking or receiving disks, or other protrusions, 18 and 20 that match the top and bottom indentations in the center of the container. These locking disks or protrusions 18 and 20 are molded in or attached and extend toward the top and bottom arms 12 and 14 and, in combination, lock the container in place. The locking disks or protrusions 18 and 20 are seen more clearly from the side view of FIG. 3. The placement and design of the locking disks 18 and 20, in alignment with the depression in the top and bottom of the container, are clearly illustrated in FIGS. 6–9. These figures further show how one or more recesses can replace the locking disks or protrusions 18 and 20 to enable containers having indentations or ridges to interact with the top arms. It should be noted that the containers for use with the disclosed rack usually contain either a recess or a protrusion in the lid. The lid and the arm must interact, enabling the container to fit snugly into the opposing projection or hollow in the center of the container. The top and bottom arms 12 and 14 can be molded to form a receiving plate or, as illustrated, the disks or protrusions 18 and 20 can be attached or molded to both the bottom and top arms 12 and 14. It should be noted that the disks or protrusions 18 and 20 can be attached or molded to both the bottom and top arms 12 and 14 attaching the disks or protrusions 18 and 20 onto the arms 12 and 14, does not necessarily indicate that the disks or protrusions 18 and 20 are separate pieces, but rather that the thickness is greater than when the plate is molded as part of the bottom or top arm. The additional depth created by the placement of the disks or protrusions 18 and 20 onto the top and bottom arms 12 and 14 is easily seen in FIG. 3.

In the preferred embodiment the back 16 of the rack 10 has mounting keyholes 22, or the equivalent, to mount the rack 9 to surfaces such as walls, cabinets, peg boards and counter tops. Other means for mounting the rack can also be incorporated, such as Velcro®, adhesives, tape, screws, or other mechanical fasteners. The rack 10, as illustrated, is provided with cutouts 24 to reduce the amount of material used and therefore the weight. In some embodiments, where the rack 10 is being used for heavier weight materials, the cutouts 24 can be eliminated.

The illustrated design in FIGS. 1–5 is for a specific design of containers, which are illustrated placed within the rack 10 in FIG. 5. As illustrated in FIGS. 6–10, altering the configuration of the top and bottom arms to accommodate a specific container design can easily be accomplished and further alterations will be obvious to those in the art. The disclosed rack is advantageous in use with baby products and can be easily used in the shower to hold hair and body care products. The easy insertion and removal of the containers makes use of the disclosed rack and coordinating containers ideal for use in times when other activities are involved that may hamper handling the containers, such as changing a baby. An example of a system 50 that is applicable for use with coordinating bottles is illustrated in FIG. 6. The top arm 54 is provided with a flange 52 that is dimensioned to coordinate with the outlet 60 of the bottle 58. The fit between the flange 52 and the outlet 60 must be sufficiently tight to prevent the product contained within the bottle 58 from evaporating. The bottom plate 56 is dimensioned to receive the base of the bottle 58 as disclosed heretofore. The system 50 is an illustration of the coordination between the racks and the bottles and is not intended to limit the configuration or dimension of either the bottles or the rack.

In FIG. 7 the bottle lid 70 has three indentations 72 that are matched by the ridges 74 within the top arm 76. In FIG. 8 the container lid 80 is designed with a peak 82 that interacts with the peak 84 of the top arm 86. In FIG. 9 the indentation 98 in the in the container 92 and the indentation 97 within the lid 90 are approximately equal, as can be seen by the top protrusion 94 and bottom protrusion 96. The containers illustrated in FIGS. 7–9 are examples and are not intended to limit the scope of the invention.

In order to enable a single rack to accommodate various sized containers, the rack 110 of FIGS. 10 and 11 has an adjustable back and locking bases. The top portion 112 forms the upper back panel 130 and the top arms 132. The bottom portion 114 forms the lower back panel 136 and bottom arms 134. The basic configuration is the same as described heretofore, with the gripping means being on the top and bottom of the device. The top arms 132 and bottom arms 134 are manufactured with adjustment slots 120. The top locking bases 116 and bottom locking bases 118 are maintained in place through the use of locking bolts 122 or other means. As shown in FIG. 11, the locking bolts 122 extend through the arms 132 and 134 into locking disks 116 and 118. The length of the locking bolts 122 must enable the bolts to be tightened to lock the bases 116 and 118 into position without breaking through the disks 116 and 118. The circumference of the locking bolts must be proportional to the notches to enable the bolts to slide within the notch without excessive side to side movement. Locking bolts 122 are used herein as examples of locking methods, and other locking devices, such as snap locks, can be substituted.

The upper back panel 130 and lower back panel 136 are dimensioned to overlap and are connected through use of a pair of slots 124 and locking bolts 126. In the event the length of the rack is dramatically increased, the number of notch and locking bolt combinations must also be increased to maintain stability. The slots 124 can be placed in one or both the upper back panel 130 and the lower back panel 136. Use of the slots 124 in both panels provides additional size variation, however they must be positioned to enable interaction. Other methods of locking the sliding elements in the desired position will be obvious to those skilled in the art. Although the slots 120 are illustrated manufactured within the top and bottom arms 132 and 134, the slots can be placed in the locking disks. Further, although the locking disks illustrated in FIGS. 10 and 11 are flat, it should be noted that the recess and protrusions noted heretofore can be incorporated with this embodiment. Although both the back and the arms are illustrated herein as being adjustable, the design can readily be modified to provide adjustability in only the arms or the back.

The above description of the invention is intended to be illustrative and not limiting. Various changes or modifications in the embodiments described will occur to those skilled in the art. These can be made without departing from the spirit or scope of the invention.

What is claimed is:

1. A rack for releasably maintaining containers in an upright position, said rack having:

at least one back wall, said at least one back wall having a first side and a second side, at least one top arm extending from said first side of said back wall, said at least one top arm being at a substantially right angle to said first side of said at least one back wall, at least one interaction member protruding from an end portion of said top arm furthest from said back wall;

at least one bottom arm extending from said first side of said back wall, said at least one bottom arm being at a substantially right angle to said first side of said at least one back wall, and wherein said bottom arm is adapted to support a container, whereby said second side of said back wall is adapted to be secured to a support surface.

2. The rack of claim 1 wherein said at least one top arm and said at least one bottom arm are integral with said at least one back wall.

3. The rack of claim 1 wherein said at least one back wall comprises an upper back wall and a lower back wall, said upper back wall and said lower back wall being adjustably attached to one another, thereby increasing or decreasing the distance between said at least one top arm and said at least one bottom arm.

4. The rack of claim 1 further comprising a receiving plate, said receiving plate being adjacent said at least one bottom arm, thereby creating a thickness greater than said at least one top arm.

5. The rack of claim 4 wherein said receiving plate is adjustable in relation to said at least one bottom arm.

6. The system of claim 4 wherein said at least one interaction member receiving area is a depression within said lid.

7. The rack of claim 1 wherein said at least one interaction member is movably connected in parallel relation to said at least one top arm.

8. The rack of claim 1 wherein said at least one interaction member protrudes from said at least one top arm.

9. The rack of claim 1 wherein said at least one interaction member is a recess within said at least one top arm.

10. The rack of claim 1 further comprising a container, said container having a base and a lid, said lid having at least one interaction member receiving area, said interaction member receiving area being dimensioned to receive said interaction member.

11. The rack of claim 10 wherein said at least one interaction member receiving area is a protrusion extending from said lid.

12. The rack of claim 10 wherein said at least one interaction member receiving area is a depression within said lid.

13. The rack of claim 10 wherein said interaction member receiving area is a dispensing outlet for said container and said interaction member seals said outlet.

14. The rack of claim 10 wherein said container base further comprises at least one base plate, said base plate being dimensioned to interact with a receiving plate of said bottom arm.

15. In combination, a rack and container system, said system releasably maintaining said container within said rack, said system having:
   said rack having,
   at least one back wall, said at least one back wall having a first side and a second side;
   at least one top arm, said at least one top arm being at a substantially right angle to said first side of said at least one back wall;
   at least one interaction member protruding from an end portion of said top arm furthest from said back wall, said interaction member engaging said container;
   at least one bottom arm, said at least one bottom arm being at a substantially right angle to said first side of said at least one back wall, wherein said bottom arm is adapted to support said container;
   said container having:
   a base, and
   a lid, said lid having at least one interaction member receiving area, said at least one interaction member receiving area receiving said at least one interaction member of said at least one top arm; and
   said second side of said at least one back wall is adapted to be secured to a support surface.

16. The system of claim 15 wherein said at least one top arm and said at least one bottom arm are integral with said at least one back wall.

17. The system of claim 15 wherein said at least one interaction member protrudes from said at least one top arm.

18. The system of claim 15 wherein said interaction member receiving area is a dispensing outlet for said container and said interaction member seals said outlet.

19. The system of claim 15 wherein said container base further comprises at least one base plate, said base plate being dimensioned to interact with a bottom arm receiving member.

20. A wall mounted rack for releasably maintaining containers in an upright position, the rack having:
   a back wall, said back wall having a first side and a second side;
   at least one top arm, said at least one top arm extending at a substantially right angle from said first side of said back wall and having at least one interaction member, said at least one interaction member protruding from said at least one top arm,
   at least one bottom arm, said at least one bottom arm extending at a substantially right angle from said first side of said back wall and having at least one receiving plate;
   a means for receiving a fastener to secure said rack to a wall;
   wherein said at least one top arm and said at least one bottom arm are integral with said back wall.

21. The rack of claim 20 further comprising a container, said container having a lid, said lid having at least one interaction member receiving area, said interaction member receiving area being a depression within said lid and dimensioned to receive said interaction member and said container further having a base, said base having at least one base plate, said base plate being dimensioned to interact with said bottom arm receiving plate.

* * * * *